United States Patent [19]

Ryan et al.

[11] 3,930,066

[45] Dec. 30, 1975

[54] TECHNIQUE FOR FABRICATION OF FOIL ELECTRET

[75] Inventors: Francis William Ryan, Millington; Harold Schonhorn, New Providence; Gerhard Martin Sessler, Summit; James Edward West, Plainfield, all of N.J.

[73] Assignee: Bell Telephone Laboratories, Incorporated, Murray Hill, N.J.

[22] Filed: July 12, 1973

[21] Appl. No.: 378,580

[30] Foreign Application Priority Data
July 24, 1972 Switzerland.................. 10990/72

[52] U.S. Cl................ 427/79; 427/35; 428/422; 307/88 ET; 252/63.2
[51] Int. Cl.².................................. H01F 27/42
[58] Field of Search......... 117/213, 93.3, 138.8 UF, 117/47 A; 252/63.2, 63.5; 307/88 ET

[56] References Cited
UNITED STATES PATENTS

| | | | |
|---|---|---|---|
| 2,465,713 | 3/1949 | Dimmick | 117/93.3 |
| 2,883,257 | 4/1959 | Wehe | 117/47 A |
| 3,069,286 | 12/1962 | Hall | 117/47 A |
| 3,419,487 | 12/1968 | Robbins et al. | 117/212 |
| 3,619,246 | 11/1971 | Bragole | 117/138.8 UF |
| 3,644,605 | 2/1972 | Sessler et al. | 307/88 ET |
| 3,676,181 | 7/1972 | Kowalewski | 117/138.8 UF |
| 3,706,131 | 12/1972 | Turnholt | 307/88 ET |

OTHER PUBLICATIONS

Dudgale et al., Glow Discharge Material Processing, pp. 36–37 (1971).

*Primary Examiner*—John D. Welsh
*Attorney, Agent, or Firm*—E. M. Fink

[57] ABSTRACT

A technique for the fabrication of thin film electrets suitable for transducer applications is described. The technique involves irradiating a perfluorinated polymer foil with an electron beam, depositing gold upon the irradiated polymer charging the metallized film and baking the resultant structure. The described technique results in only limited and reversible damage to the charge storage properties of the polymer which is in marked contrast with prior art processes.

6 Claims, 4 Drawing Figures

TECHNIQUE FOR FABRICATION OF FOIL ELECTRET

This invention relates to a technique for the fabrication of a metallized thin film foil-electret and to the electret so produced. More particularly, the present invention relates to a technique for the fabrication of a thin film foil electret comprising a fluorinated polymer having deposited thereon a thin film of gold, and to the electret so produced.

During the past few years a rebirth of interest has occurred in the class of structures commonly termed "foil electrets", such structures being suitable for use in electrometers, dosimeters, and most significantly, as the vibratile diaphragm of electroacoustic transducers. The diaphragm in such structures has heretofore been comprised of a metallized (typically aluminum) thin foil of a fluorinated ethylene-propylene copolymer or polytetrafluoroethylene, such compositions being marketed commercially under the tradename of "Teflon FEP" or "Teflon" respectively. The metallized foil is converted into an electret by any well known technique prior to the fabrication of a transducer or any of the above noted devices. Studies of such electret structures have revealed that air oxidation of the aluminum often caused corrosion, a phenomenon which typically results in contact failure of large insensitive areas. Emphasis was then shifted to gold, a metal which ordinarily does not adhere well to Teflon; such being attributed to the presence of surface regions of low mechanical strength in the fluorinated polymer. Although various treatments are well known in the art for modifying such surface regions and thereby strengthening boundary layers, these treatments typically have a degrading effect on the charge storage properties of Teflon.

In accordance with the present invention, a novel technique is described for the fabrication of a perfluorinated foil electret having a layer of gold deposited thereon, such technique effectively obviating the prior art deficiencies. Briefly, the inventive technique involves bombarding one surface of a perfluorinated foil with an electron beam of specified energy and intercepted charge density, depositing gold upon the bombarded surface, charging the uncoated surface of the polymer (for example, with an electron beam) and controlled baking of the metallized foil electret. Electrets produced in accordance with the described technique evidence limited and reversible damage in charge storage properties of the polymer while retaining excellent adherency characteristics.

The invention will be more fully understood by reference to the following detailed description taken in conjunction with the accompanying drawing wherein.

Figure 3:
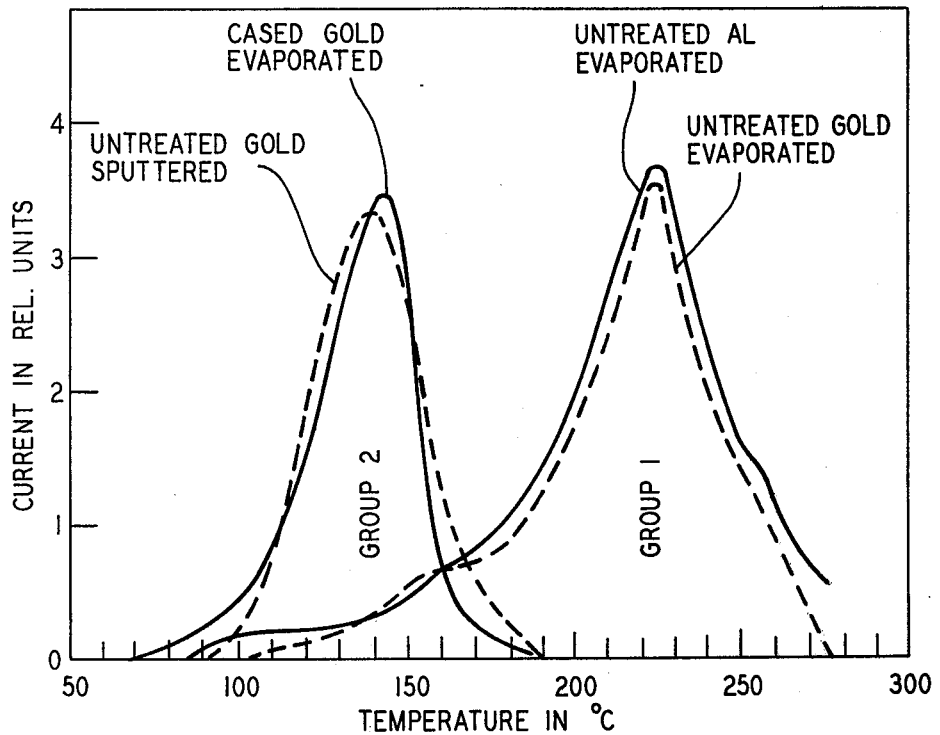
FIG. 3 is a graphical representation on coordinates of current in relative units against temperature in degrees centigrade showing thermally stimulated current characteristics for treated and untreated Teflon foil samples having gold or aluminum coatings.
Figure 4:
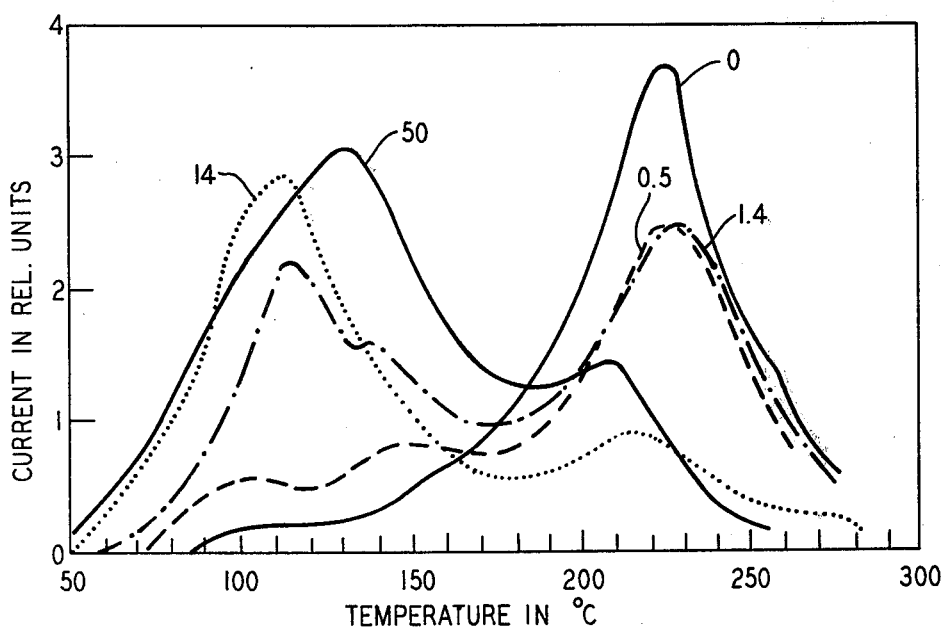
Figure 5:
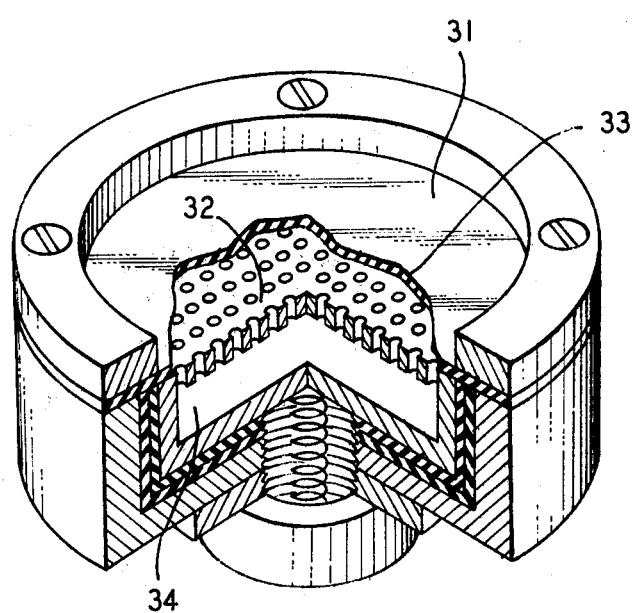

FIG. 4 is a graphical representation on coordinates current in relative units against temperature in degrees centigrade showing thermally stimulated current characteristics for gold coated Teflon FEP samples bombarded with an electron beam in accordance with the present invention; and FIG. 5 is a sectional view of an electrostatic acoustic transducer including a thin film foil-electret prepared in accordance with the invention.

The first step in the fabrication of a thin film electret in accordance with the present invention, involves bombarding one surface of a sample of a perfluorinated polymer with a monoenergetic electron beam source capable of producing an electron beam having an energy within the range of 2.5 to 40 keV and an intercepted charge density within the range of $10^{-8}$ to $10^{-5}$ C/sq.cm., such ranges being dictated by practical considerations. More specifically, the use of beam energies or charge densities less than the noted minima fail to enhance the bondability of subsequently deposited gold whereas the use of beam energies beyond the noted maxima tend to be too penetrating for practical use while use of higher intercepted charge densities tends to destroy the electrical characteristics of the fluorinated polymer.

Figure 1:
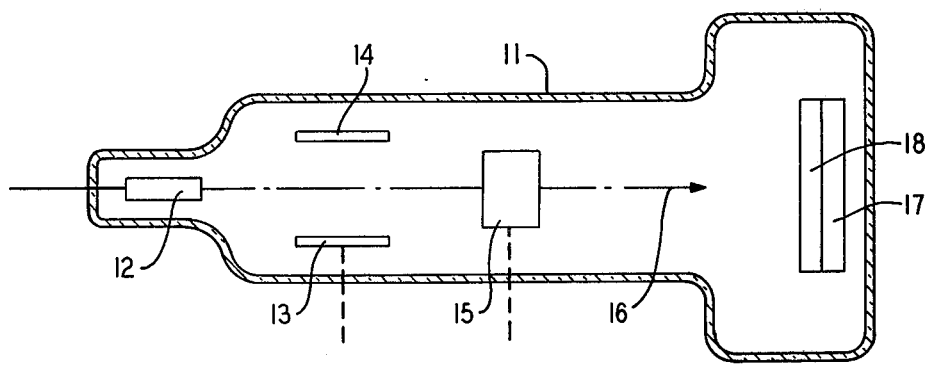
FIG. 1 is a sectional view of an apparatus suitable for effecting electron bombardment of polymer foils in accordance with the present invention.

Bombardment is conveniently effected in an apparatus of the type shown in FIG. 1. Shown in the FIG. is a vacuum chamber 11 having disposed therein electron beam source 12, vertical deflection plates 13 and 14 and horizontal deflection plate 15 for controlling the electron beam 16 emanating from source 12 during bombardment and a grounded metal backplate 17. In the operation of the bombardment process, a sample 18 is positioned in front of backplate 17 between cardboard rings which leave a circular area of polymer exposed, sample 18 being either fluorinated ethylene-propylene copolymer or polytetrafluoroethylene. After evacuation of chamber 11, sample 18 is bombarded with a scanned monoenergetic electron beam having an energy within the range of 2.5 to 40 keV and an intercepted charge density ranging from $10^{-8}$ to $10^{-5}$ C/sq.cm. Following bombardment, sample 18 is removed from chamber 11 and stored charge density measurements taken by conventional non contacting or contacting techniques. The stored charge density of the irradiated sample is negative on the irradiated side and positive, but of equal magnitude, on the nonirradiated surface.

The next step in the fabrication of an electret in accordance with the invention typically involves mounting the irradiated sample in an evaporation chamber with the bombarded surface exposed. Thereafter a thin film of gold having a thickness within the range of 500 to 5000 A is deposited thereon to serve as one electrode of the desired electret. The thickness of the gold film is not critical for most applications and is determined solely by continuity considerations.

After evaporation has been effected, the sample is charged by any well known technique. This end may conveniently be effected by returning the sample to the bombardment chamber described previously and positioning it therein so as to expose the noncoated surface. Electret formation is then accomplished in accordance with the procedure described in U.S. Pat. No. 3,711,941, issued Jan. 23, 1973. Briefly, the technique described therein involves bombarding the thin film electret material with a focused and scanned monoenergetic beam operating in the range of 10–40 keV for intervals of from 1–10 seconds in a vacuum while maintaining a current density for a time interval selected to yield a current time product within the range of $10^{-8}$ to $2 \times 10^{-7}$ A sec/cm². At this juncture, the measured adhesive joint strength of the structure may conveniently be measured. FIG. 4 is a graphical representation showing measured adhesive joint strength of gold-Teflon foils prepared as described above, as a function of intercepted charge density for varying beam energies. The graph indicates that the adhesive joint strength increases with increasing intercepted charge density and beam energy up to 10 keV and subsides gradually within the 20–40 keV range.

During the course of evaluating the process, it was considered advantageous to study the effect of electron beam bombardment, glow discharge exposure, Casing, (described in U.S. Pat. No. 3,462,335, issued Aug. 19, 1969), and other processes on the charge storage properties of fluorinated polymers. This end was attained by evaluating the thermally stimulated current (TSC) generated by charged films.

Figure 2:
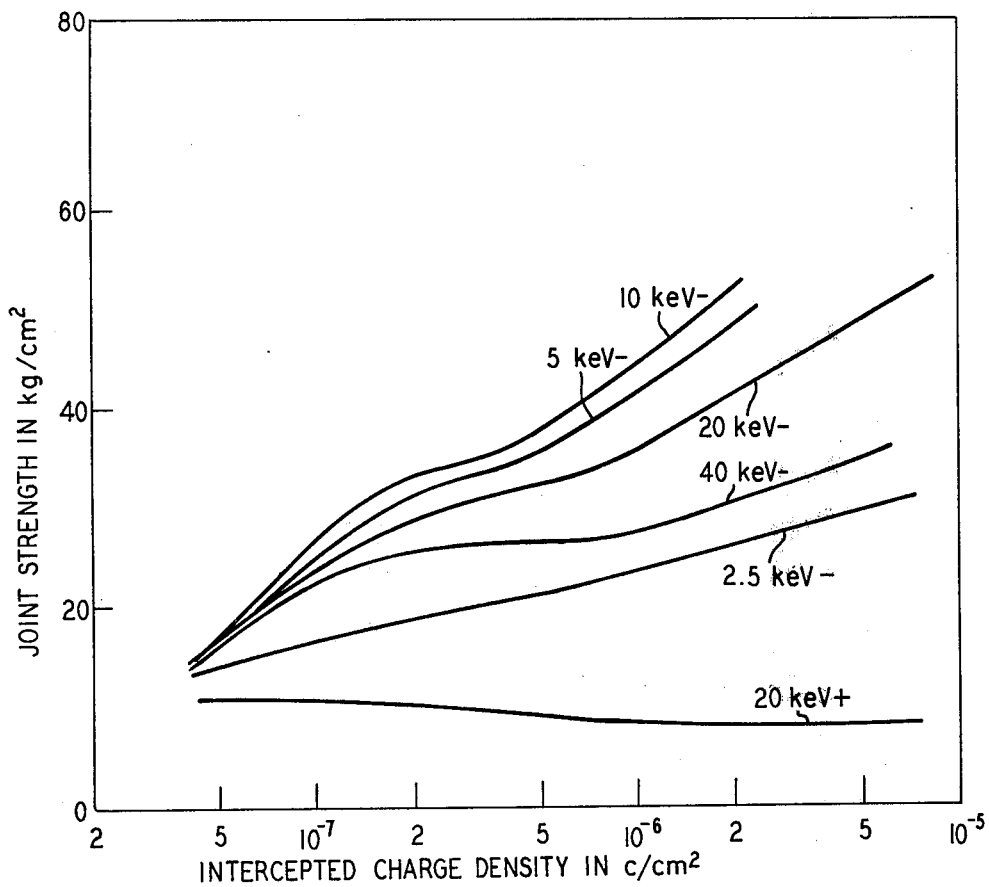
FIG. 2 is a graphical representation on coordinates of joint strength in kg/cm$^2$ against intercepted charge density in C/cm$^2$ showing adhesive joint strengths at various energy levels for gold coated Teflon-FEP samples.

With reference now to FIG. 2, there is shown a graphical representation on coordinates of current in relative units against temperature in degrees centigrade indicating the TSC characteristics for a variety of treated or untreated 25 μm Teflon FEP samples with gold or aluminum coatings charged with an electron beam having an energy of 20 keV and an intercepted charge density of $5 \times 10^{-8}$C/sq.cm. Group one in the FIG. comprises untreated films which have gold or aluminum deposited by an evaporation process whereas group two comprises polymer films coated with gold either by evaporation after a Casing treatment or deposited by sputtering. The results were obtained by electron beam charging, as noted, and measuring displacement current between the metal layer of the film and an electrode mounted on the other side of the film at a distance of 0.5 cm.

The gold or aluminum coated films of group one exhibit a major TSC peak at about 220°C in agreement with prior art observations. The group two films, however, evidenced a TSC peak at 140°C with no high temperature peaks, so indicating electrical degradation which may be attributed to hole conduction caused by sputtering or by the Casing process.

Further evaluations were then made by preparing TSC curves for polymer films which were electron beam treated in accordance with the present invention at 20 keV before gold coating. The results are shown in FIG. 4 on coordinates of current in relative units against temperature in degrees centigrade. The films represented therein were 25 μm Teflon FEP samples heated at 3.8°C per minute. The pretreatment involved bombardment at 20 keV and intercepted charge densities, as shown, in units of $10^{-7}$C/sq.cm., deposition of gold, and charging at 20keV at an intercepted charge density of $5 \times 10^{-8}$C/sq.cm. As noted all curves evidenced the presence of a 110° to 130° peak as well as the 220°C peak, the population of the low temperature peak increasing with increasing charge density at the expense of the population of the high temperature peak. Similar effects were observed for film treated with other energies over the noted range. In order to increase the relative population of the high temperature peaks of such gold coated films, it was found advantageous to heat the prepared films after the second electron bombardment to a temperature of at least 140°C for a time period of the order of one hour. This enhances the charge stability of the films by dissipating most of the charge in the trap corresponding with the low temperature peak.

Following treatment, the prepared electret may be used in the fabrication of an electroacoustic transducer of a type depicted in FIG. 5.

With reference now more particularly to FIG. 5, there is shown a sectional view of an electroacoustic transducer including a thin film electret of the type prepared in accordance with the invention. Shown in FIG. 5 is an electrically charged perfluorinated film 31 stretched over a metal backplate 32. Film 31 typically comprises a perfluorinated ethylene-propylene copolymer (Teflon FEP) or polytetrafluoroethylene (PTFE) of a thickness of about 0.001 inch. Shown deposited upon the upper surface of film 31 is a thin layer 33 of gold deposited thereon by the above-described techniques. The metallized polymer film is charged and is commonly referred to as a metallized foil electret. The backplate surface is typically arranged so that the foil contacts its surface at discrete points or along discrete lines only. In those areas where contact is not made, shallow air pockets permit vibration of the foil upon impingement of sound waves thereon. Backplate 32 is perforated and supported above an air cavity 34. This arrangement reduces the stiffness of the air cushion behind the diaphragm and permits vibration of the film with a greater amplitude, thereby increasing transducer sensitivity.

It will be appreciated by those skilled in the art that the present invention is not limited to the fabrication of foil electrets and may be used in the fabrication of gold metallized foils suitable for diverse applications in which excellent electrical properties are desired.

What is claimed is:

1. A technique for the fabrication of a foil electret which comprises the steps of
    a. bombarding the surface of a perfluorinated foil with an electron beam having an energy level within the range of 2.5 to 40 keV and an intercepted charge density within the range of $10^{-8}$ to $10^{-5}$C/cm²,
    b. depositing a layer of gold on the resultant bombarded surface, and
    c. charging the non-gold coated surface of said foil by bombarding the resultant assembly with a focused and scanned monoenergetic beam operating in the range of 10–40 keV for intervals ranging from 1–10 seconds in a vacuum while maintaining a current density for a time interval selected to yield a current time product within the range from $10^8 - 2 \times 10^{-7}$ A sec/cm².

2. A technique in accordance with claim 1 wherein said foil is polytetrafluoroethylene.

3. A technique in accordance with claim 1 wherein said foil is perfluorinated ethylene-propylene copolymer.

4. Thin film foil electret prepared in accordance with the procedure of claim 1.

5. A technique for the fabrication of a foil electret comprising the steps of
    bombarding the surface of a perfluorinated foil with an electron beam having an energy level within the range of 2.5 to 40 keV,
    depositing a layer of gold upon the resultant bombarded surface, which when given an electret-forming electric charge exhibits a thermally-stimulated current having two peaks at two different temperatures,
charging the foil, as an electret and heating the charged foil to a temperature above the lower of said two different temperatures but below the higher of said temperatures in order to dissipate the charge in the trap corresponding with the low temperature peak by bombarding the resultant assembly with a focused and scanned monoenergetic beam operating in the range of 10-40 keV for intervals ranging from 1-10 seconds in a vacuum while maintaining a current density for a time interval selected to yield a current time product within the range from $10^8 - 2 \times 10^{-7}$ A sec/cm².

6. A technique in accordance with claim 1 wherein the resultant charged structure is heated to a temperature of the order of 140°C for about 1 hour.

* * * * *